United States Patent
Francia

(10) Patent No.: US 6,805,885 B2
(45) Date of Patent: Oct. 19, 2004

(54) FERMENTATION VAT

(75) Inventor: Marco Francia, Casale Monferrato (IT)

(73) Assignee: Gimar Tecno S.r.l., Alessandria (IT)

( * ) Notice: Subject to any disclaimer, the term of this patent is extended or adjusted under 35 U.S.C. 154(b) by 0 days.

(21) Appl. No.: 09/802,932

(22) Filed: Mar. 12, 2001

(65) Prior Publication Data
US 2003/0145735 A9 Aug. 7, 2003

(30) Foreign Application Priority Data
Mar. 13, 2000 (IT) ..................................... TO2000A0235

(51) Int. Cl.⁷ .............................................. C12G 1/032
(52) U.S. Cl. ........................... 426/11; 426/15; 426/592; 99/276; 99/277.1
(58) Field of Search ........................... 426/11, 15, 592; 99/276, 277.1

(56) References Cited

U.S. PATENT DOCUMENTS 4,652,451 A * 3/1987 Leedham et al. ............. 426/11
4,743,451 A * 5/1988 Kalina .......................... 426/15
6,279,457 B1 * 8/2001 Francia ...................... 99/277.1

FOREIGN PATENT DOCUMENTS

IT     TO97A000749      2/1999

* cited by examiner

Primary Examiner—Curtis E. Sherrer
(74) Attorney, Agent, or Firm—Sughrue Mion, PLLC

(57) ABSTRACT

An automatically operating fermentation vat for winemaking establishments includes a main vat (2), an upper vat (4) over the main vat, an uplift pipe (8, 12, 10, 24, 26) for feeding the fermenting liquid from the bottom of the main vat to the upper vat, means (16, 14, 18) for discharging this liquid from the upper vat into the main vat so as to spray the layer of marc floating in the main vat and injector means (20, 32) associated with the uplift pipe for injecting an oxygen-containing gas into the liquid flowing through the said pipe, characterized in that the uplift pipe has a first outlet aperture (24) directing liquid into the upper vat (4) and a second outlet aperture (40) which directs the liquid into the mass of liquid in the main vat, valve means (22) being associated with the uplift pipe for selectively directing the liquid into the upper vat or into the main vat or both at the same time though the two outlet apertures.

8 Claims, 3 Drawing Sheets

Fig.2
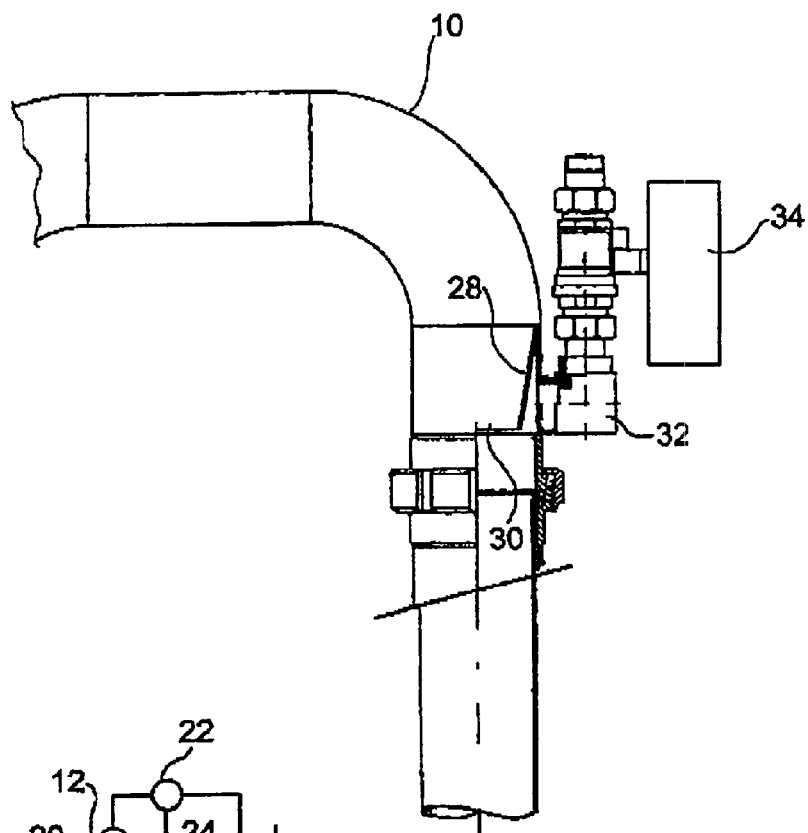
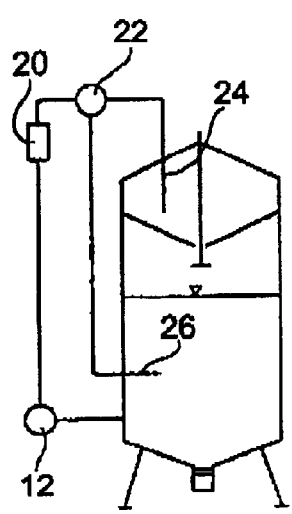
Fig.3
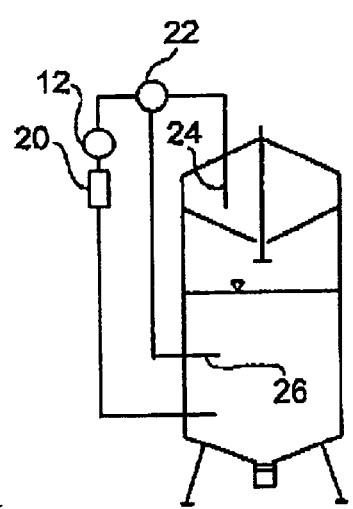
Fig.4

FERMENTATION VAT

BACKGROUND OF THE INVENTION

The present invention relates to a fermentation vat, in particular to an automatic type of vat for making red wine, which includes a main vat, an upper vat over the main vat, an uplift pipe for drawing fermenting liquid from the bottom of the main vat to the upper vat, means for releasing this liquid from the upper vat to the main vat so as to spray the layer of grape marc floating in the main vat and injector means, associated with the uplift pipe, for injecting into the liquid flowing through this pipe a flow of gas containing a suitable proportion of oxygen to oxygenate it.

During fermentation, and especially when making red wine, it is known that the must has to be oxygenated at various predetermined stages of fermentation. In particular, when making red wine, oxygenation helps metabolize yeasts since it makes it easier for fermentation to get under way, by increasing the growth of microbial flor and also prevents fermentation from stopping too early. In addition, oxygenating the must encourages condensation reactions between tannins and anthocians, thereby producing more complex molecules which make the colour more stable. Oxygenation also prevents the formation of unwelcome reduction agents and encourages the development of varietal aromas.

Patent Application TO97A000749, in the name of the present Applicant, describes a fermentation vat of the type described above, in which the must is oxygenated by aspirating ambient air and mixing it into the liquid flowing through the uplift pipe; in particular, the uplift pipe collects liquid from the bottom region of the main vat and conveys it, by means of a pump, to the upper vat, from where the oxygenated liquid is periodically released back into the main vat through a valve in the bottom of the upper vat which, when open, causes the liquid to be sprayed onto a cap of marc floating on the must/wine in the main vat.

SUMMARY OF THE INVENTION

The object of the present invention is to perfect the fermentation vat of the type described above, in order to achieve better fermentation process.

This object is achieved by providing a fermentation vat having the characteristics claimed in the introduction to the present description, characterised in that the aforesaid uplift pipe has a first outflow aperture feeding the liquid into the upper vat and a second outflow aperture feeding the liquid into the mass of liquid contained in the main vat, valve means being provided, in association with the uplift pipe, for selectively feeding the liquid into the upper vat or into the main vat, or into both, through the said outflow apertures.

Thanks to the above characteristics it is possible, at predetermined stages of the fermentation process, selectively to direct the flow of oxygenated liquid into the upper vat, and then to spray the cap of marc or, alternatively, to convey this liquid into the heart of the liquid contained in the main vat, thereby oxygenating it better and also achieving other advantages which will become apparent from the detailed description which follows.

BRIEF DESCRIPTION OF THE DRAWINGS

In the appended drawings:

FIG. 2 is an enlarged detail of FIG. 1;

FIGS. 3 and 4 are schematic illustrations of a fermentation vat of the invention;

DETAILED DESCRIPTION OF THE INVENTION

Figure 1:
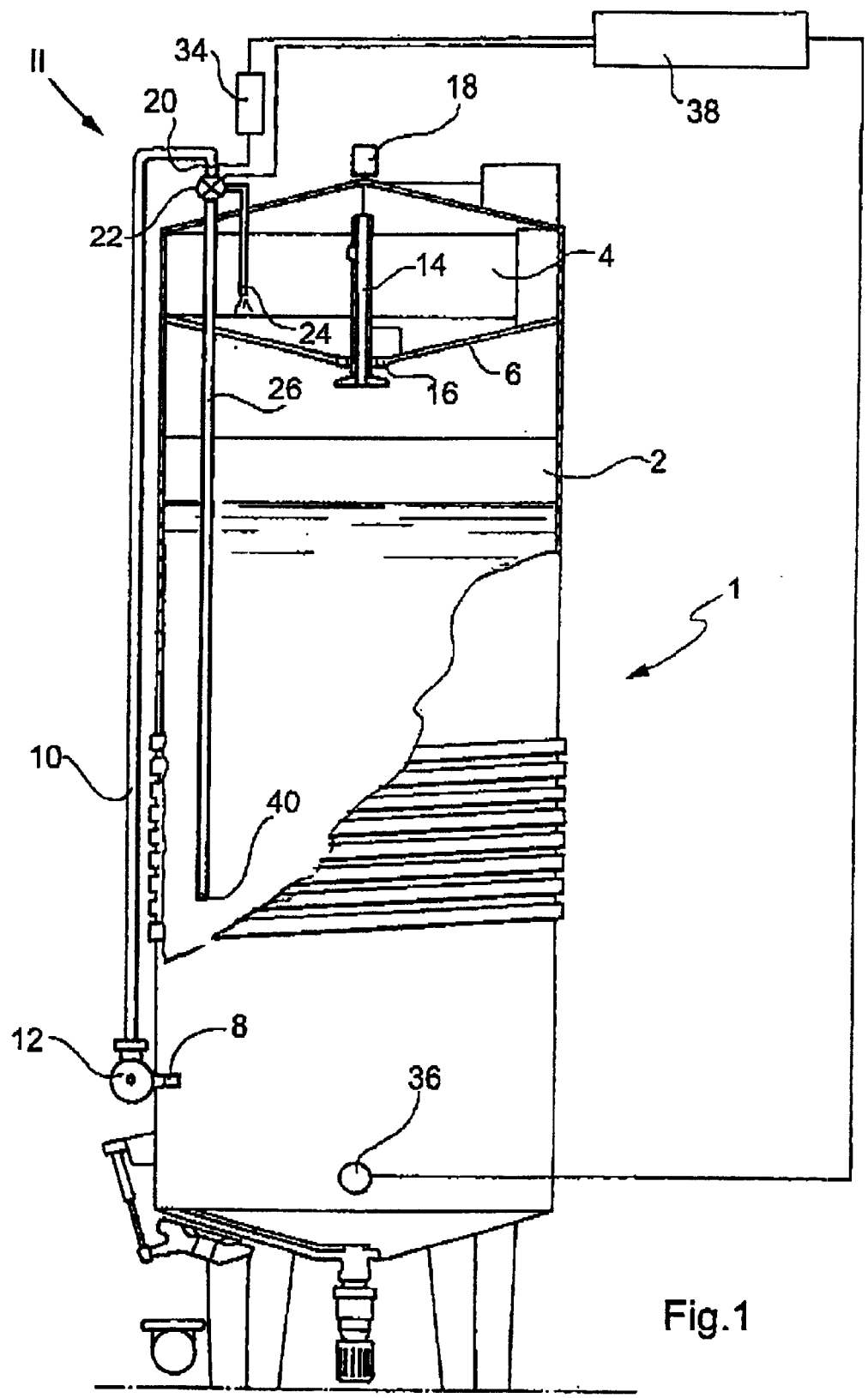
FIG. 1 is a partially sectioned front view of a wine-making fermentation vat of the invention.

With reference to the drawings, an automatically operating fermentation vat for wine making is generally indicated 1 and includes a main vat 2, for containing the pressed grapes, and an upper vat 4, positioned over the main vat and having a bottom 6. The upper vat 4 has a valve shutter 14 engaging a central aperture 16 in the bottom 6; the valve shutter 14 is operated by a pneumatic or electrically-operated piston 18 which is activated by a programmable timer or by an appropriate control unit set to run the fermentation programme.

The uplift means include a suction pipe 8, which is in communication with the lower portion of the vat 2 and a delivery pipe 10 which feeds the liquid into the upper vat 4, with a pump 12 interposed between the two pipes.

In the embodiment shown in the drawings, the delivery pipe 10 has an associated injector 20, shown in greater detail in FIG. 2, for injecting a flow of ambient air into the liquid flowing through the uplift pipe in order to oxygenate it. Downstream of the injector 20 there is a valve 22 in the delivery pipe 10 so as to be in communication with a pipe 24 which introduces the liquid into the upper vat 4 and with a pipe 26 for introducing the liquid into the mass of fermenting liquid through an outflow aperture 40.

The valve 22 can be manual but is preferably a servo-operated automatic valve which can be controlled by a control unit programmed to control the fermentation cycle.

Typically, the valve 22 is a three-way valve provided to feed the liquid selectively either into the vat 4 through the pipe 24 or into the vat 2 through the pipe 26, or to stop the flow of liquid through the uplift pipe.

Figure 5:
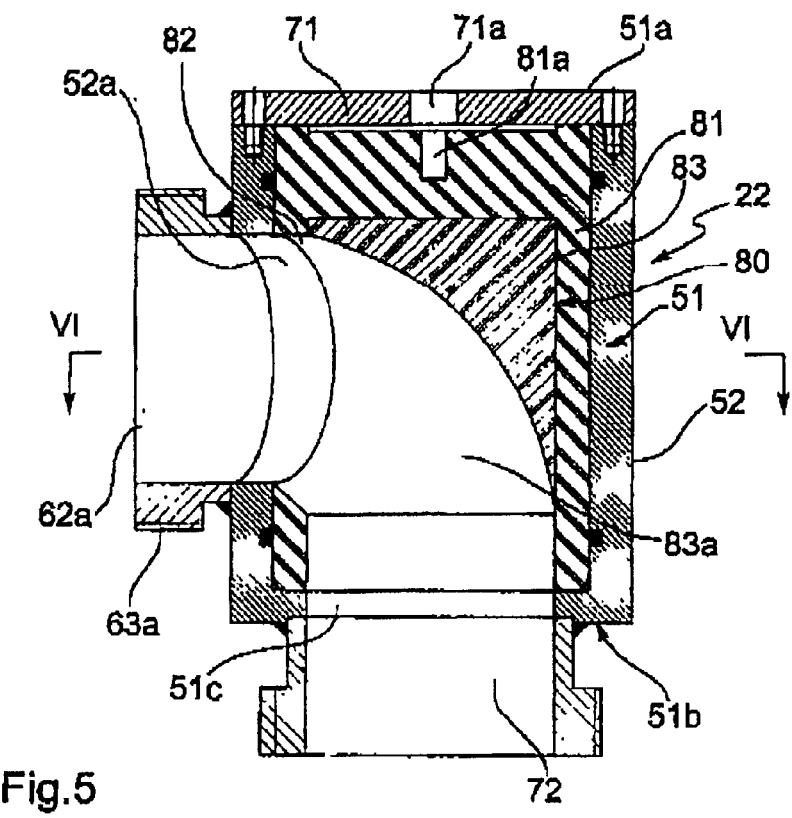
FIG. 5 is a longitudinally sectioned view of a valve forming part of the fermentation vat of FIG. 1.
Figure 6:
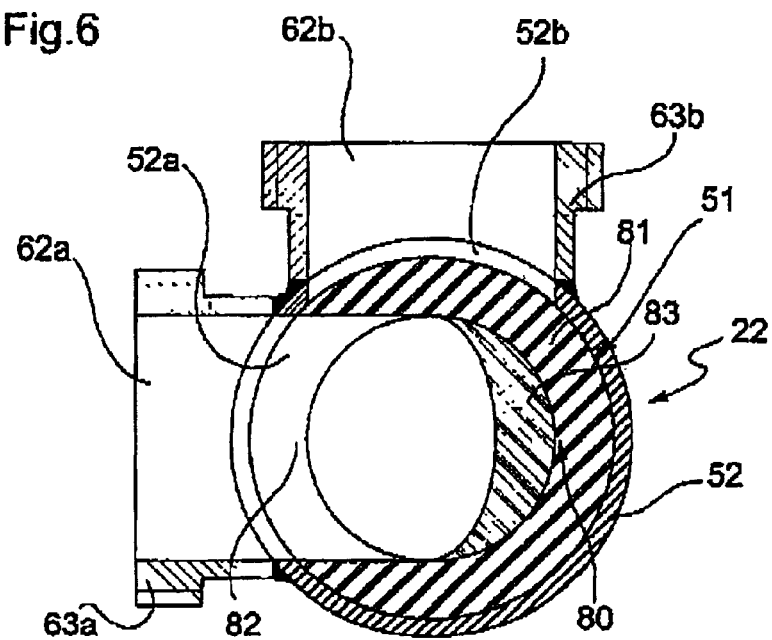
FIG. 6 is a cross-sectional view of the valve of FIG. 5, taken on the line VI—VI.

A preferred embodiment of the valve 22 is shown in FIGS. 5 and 6; this valve has a hollow, cylindrical body 51, with two circular outlet apertures 52a, 52b in its lateral surface 52. The radial axes perpendicular to the axis of symmetry of the body 51 and which pass through the centres of the circular apertures 52a, 52b, preferably form a 90° angle.

Connector unions 62a, 62b, with threaded flanges for engaging pipes on their free ends 63a, 63b, are welded to the lateral surface 52, coaxially with the apertures 52a, 52b. The connector unions 62a, 62b are connected to the pipe 24 and the pipe 26 respectively by means of the aforesaid flanges.

The body 51 also has a closed end 51a, with a lid 71 which is screwed to the body, and an open end 51b with an inlet aperture 51c. An inlet union 72 is welded to the inlet aperture 51c, with a threaded flange on its free end for the connection of pipes. The inlet union 72 is connected to the delivery pipe 10 by this flange.

A substantially cylindrical valve shutter 80 is housed coaxially inside the body 51, so that it can rotate sealably therein. The valve shutter 80 includes a cylindrical casing 81, open at the site of the inlet aperture 51c, and a connector element 83. The casing 81 has an exit through-hole 82 in its lateral surface and can be rotated selectively so that the hole 82 is coaxial with one of the circular outlet holes 52a, 52b. A substantially cylindrical connector element 83 is securely fixed inside the casing 81, with its connecting portion 83a shaped so as to form a 90° elbow joint between the inlet aperture 51c and one of the outlet apertures 52a, 52b. With such a valve shutter, the liquid can enter the valve in a regular flow, without creating excessive turbulence or pooling.

The valve 22 is operated and controlled by a control shaft (not shown). This shaft passes through a hole 71a in the centre of the cover 71 and engages in a grooved cavity 81a in the closed end of the casing 81, in such a way that rotation of the shaft causes the valve shutter 80 to rotate as well.

It is possible for the valve 22 to have an additional open position in which the liquid is fed to the two vats 2 and 4. A preferred embodiment of the injector 20 is shown in FIG. 2; this injector includes a nozzle 28, inside the delivery pipe 10, with a restricted section 30. Near the restricted section 30, the pipe 10 is in communication with an air-suction pipe 32. The pipe 32 has an associated manual or servo-operated valve 34 for intercepting and regulating the flow of air which is aspirated. It has been found that an injector of the type shown in FIG. 2 gives the best results in terms of volume of air aspirated, thereby avoiding any risk of blockages due to solids suspended in the liquid flowing through the uplift pipe.

It is clear, however, that the invention should not be seen as limited to injector means of the type shown. Venturi type injectors, such as those described in the Patent Application TO97A000749 by the present Applicant, could be used, or any type of injector or ejector or jet pump, operable to ensure that the liquid is efficiently oxygenated during the uplift cycle. The scope of the invention also extends to injection of oxygen either into the delivery pipe 10 as described, or into the suction pipe 8 or through an inlet aperture in the pump 12. The injection of oxygen is preferably carried out upstream of the valve means 22.

Equally, although the drawings show the pipe 26 as a semi-immersed tube, with its free end in the liquid in the main vat 2, it is clear that the invention is not limited to this configuration. For example, the liquid could be conveyed to the lower vat 2 by means of a tube entering the vat through one side, as shown schematically in FIGS. 3 and 4, for example; it is clear that, with reference to the diagrams of FIGS. 3 and 4, the injector means, indicated 20, should be located in the uplift pipe.

The fermentation vat preferably includes sensor means 36, operable to monitor a parameter in the fermenting liquid which would indicate how the fermentation is progressing or the degree of oxygenation and to emit a signal indicating this parameter to a control unit 38, programmed to control the opening or closing of the valve means 34 associated with the injector, in dependence on the signal received from the sensor means. This parameter indicating the progress of fermentation can be the density of the liquid or a Redox potentiometer, able to measure the level of oxidation of the liquid. The control unit 38 can form part of the overall control unit of the wine-making process, which controls temperature, operation of the uplift cycle and release of the liquid from the upper vat to the lower vat, as well as operation of solenoid valve 22.

The structural characteristics of the fermentation vat of the invention make it possible to improve various aspects of the fermentation process. First, during the first phases of the operating cycle, the main vat is filled to a predetermined level with pressed grapes; the so-called "cap" of marc then forms in the upper portion of the vat. In this initial stage, the fermentation vat of the invention makes it possible to run uplift cycles during which liquid is collected from the bottom of the vat 2, oxygenated by aspirated ambient air and returned to the main vat through the tube 26 which opens into the middle of the liquid. This operation was found to generate an advantageous flotation effect, which led to a speedier separation of the marc cap. The turbulence caused by the flow of oxygenated liquid into the mass of liquid substantially improves the oxygenation effect and also acts to remove carbon dioxide which is beginning to form in the fermenting mass.

This speedy formation of the cap means that uplift cycles can be started sooner, initially along with oxygenation, the valve 22 being put into communication with the tube 24, so that the oxygenated liquid moves up into the upper vat 4. In these first uplift cycles, the liquid conveyed into the upper vat 4 is discharged through the aperture 16, with the valve shutter open 14, thereby spraying a jet onto the cap. This operation can be followed by a period of maceration, without oxygenation, during which cycles of uplift and spraying of the cap can be carried out with the valve 34 closed, which cuts off the intake pipe 32 of the injector 28. Additional must oxygenation cycles can be carried out at the discretion of the wine maker either during the stage of tumultuous fermentation and in the final stages.

It is also advantageous to carry out further oxygenation operations, channelling the flow of oxygenated liquid through the pipe 26 directly into the heart of the mass contained in the main vat, at the end of the fermentation process, when the cap separation effect created by the generation of carbon dioxide is wearing off. Under these conditions, the directing of a flow of oxygenated liquid through the tube 26 makes it possible to cause the cap to float up again, thereby facilitating the run-off operation and improving the yield of quality must.

Generally speaking, the oxygenation process, carried out by directing oxygenated liquid into the heart of the liquid in the main vat 2, makes it possible substantially to improve the oxygen yield, increasing the percentage of oxygen contained in the air intake which is dissolved in the must, compared to that found when the liquid is carried to the upper vat 4 through the uplift pipe.

In view of the operating characteristics described above, and of the advantages arising therefrom, a further object of this invention is also to provide a fermentation method, in particular for red wine, to be carried out in a vat having the characteristics described in the above description and in the Claims which follow, and which includes the steps of:

carrying out cycles for oxygenating the liquid in the main vat by drawing off liquid from the bottom of the said vat, aspirating ambient air and mixing it with the flow of liquid and returning the oxygenated liquid to the mass of liquid in the main vat, and carrying out cycles for oxygenating the liquid in the main vat by drawing off liquid from the bottom of the said vat, aspirating ambient air and mixing it with the flow of liquid, conveying the oxygenated liquid to the upper vat and discharging this liquid from there into the main vat, thereby spraying the marc floating on the liquid contained therein.

It is clear that an operator can programme these operations by means of the control unit which controls the automatic operation of the fermentation vat.

What is claimed is:

1. An automatically operating fermentation vat for wine-making establishments comprising a main vat (2), an upper vat (4) over the main vat, an uplift pipe (8, 12, 10, 24, 26)

for conveying a fermenting liquid from the bottom of the main vat to the upper vat, means (16, 14, 18) for discharging this liquid from the upper vat into the main vat in such a way that it sprays a layer of marc floating on the surface of the main vat, and injector means (20, 32) associated with the uplift pipe for injecting oxygen-containing gas into the liquid as it flows through this pipe, characterised in that the uplift pipe has a first outlet aperture (24) which feeds the liquid into the upper vat (4) and a second outlet aperture (40) which feeds the liquid into the fermenting liquid in the main vat, selective valve means (22) being associated with the uplift pipe for selectively directing the liquid into the upper vat or into the main vat, or into both at the same time through the two said outlet apertures.

2. A fermentation vat according to claim 1, characterised in that the said injector means (28, 32) includes a nozzle (28) with a narrow opening (30) and a side pipe (32) adjacent the said nozzle for aspirating ambient air, on/off valve means (4) being provided for cutting off the flow of air aspirated through the said intake pipe (32).

3. A fermentation vat according to claim 1, characterised in that the said selective valve means (22) include a valve body (51) in the shape of a hollow cylinder, at least two outlet apertures (52a, 52b) in the lateral surface of the said valve body, an inlet aperture (51c) in one end of the said valve body and a cylindrical valve shutter (80) arranged for coaxial rotation within the said body and shaped so as to form a 90° elbow joint between the said intake aperture and one of the said outlet apertures.

4. A fermentation vat according to claim 1, characterised in that the said injector means (28, 32) are located in the uplift pipe upstream of the said selective valve means (22).

5. A fermentation vat according to claim 1, characterised in that the said injector means (28, 32) are located on the uplift pipe downstream of the said selective valve means (22) and on at least one of the pipes (24, 26) leading from the said valve means (22) to deliver the liquid into the upper vat and/or into the main vat.

6. A fermentation vat according to claim 1, characterised in that it includes a control unit (38) which cooperates with the said selective valve means (22) associated with the uplift pipe and is operable to control:

operations to oxygenate the liquid in the main vat (2) by drawing off liquid from the bottom of the said vat, aspirating ambient air, mixing it into the flow of liquid and returning the oxygenated liquid to the main vat, and operations to oxygenate the liquid in the main vat (2) by drawing off liquid from the bottom of the said vat, aspirating air and mixing it with the flow of liquid, then conveying the oxygenated liquid to the upper vat (4) and discharging it therefrom into the main vat, thereby spraying the marc cap floating on the must.

7. A fermentation method, in particular for red wine, carried out in a fermentation vat according to claim 1, characterised in that it includes the steps of:

a) carrying out cycles for oxygenating the liquid in the main vat by drawing off liquid from the bottom of the said vat, aspirating ambient air and mixing it with the flow of liquid and returning the oxygenated liquid to the mass of liquid in the main vat, and b) carrying out cycles for oxygenating the liquid in the main vat by drawing off liquid from the bottom of the said vat, aspirating ambient air and mixing it with the flow of liquid, conveying the oxygenated liquid to the upper vat and discharging this liquid from there into the main vat, thereby spraying the marc floating on the liquid contained therein.

8. A method according to claim 7 in which the said operation a) is carried out at the start of the fermentation process and/or at the end of the fermentation process in order to encourage the marc cap to separate and float to the surface.

* * * * *